United States Patent

[11] 3,580,340

| [72] | Inventor | David N. Brown |
| | | 1426 Erie St., Ottawa, Ill. 61350 |
| [21] | Appl. No. | 770,740 |
| [22] | Filed | Oct. 25, 1968 |
| [45] | Patented | May 25, 1971 |

[54] ELECTRONIC MARKER ACTUATOR
3 Claims, 6 Drawing Figs.

[52] U.S. Cl........................................................ 172/126,
111/33, 292/125
[51] Int. Cl........................................................ A01b 69/02
[50] Field of Search............................................ 111/33;
172/126, 127, 128, 129, 130, 131, 132; 292/121,
122, 125, 201

[56] References Cited
UNITED STATES PATENTS

| 2,502,067 | 3/1950 | Weaks | 172/128 |
| 2,733,427 | 1/1956 | Chandler | 292/201X |
| 2,759,409 | 8/1956 | Immesoete | 172/126 |
| 2,840,405 | 6/1958 | Feltz et al. | 292/122 |
| 2,975,840 | 3/1961 | Sorensen et al. | 111/33X |
| 3,131,773 | 5/1964 | Cox | 111/33X |
| 3,146,833 | 9/1964 | Friemel et al. | 172/126 |

*Primary Examiner*—Robert E. Pulfrey
*Assistant Examiner*—C. Coughenour
*Attorney*—Berman, Davidson & Berman

ABSTRACT: An electronic marker actuator for use with an agricultural device such as a planter that is provided with a pivotally connected marker which may be disposed in a substantially vertical position at one time, and released so as to be disposed in a horizontal position at another time, with pushbutton means disposed on the planter and catch means normally maintaining the marker in an upright position, and solenoid means operatively connected to the pushbutton means so as to actuate the catch means and release the marker from its upright position to a horizontal position.

PATENTED MAY 25 1971
3,580,340
SHEET 1 OF 2
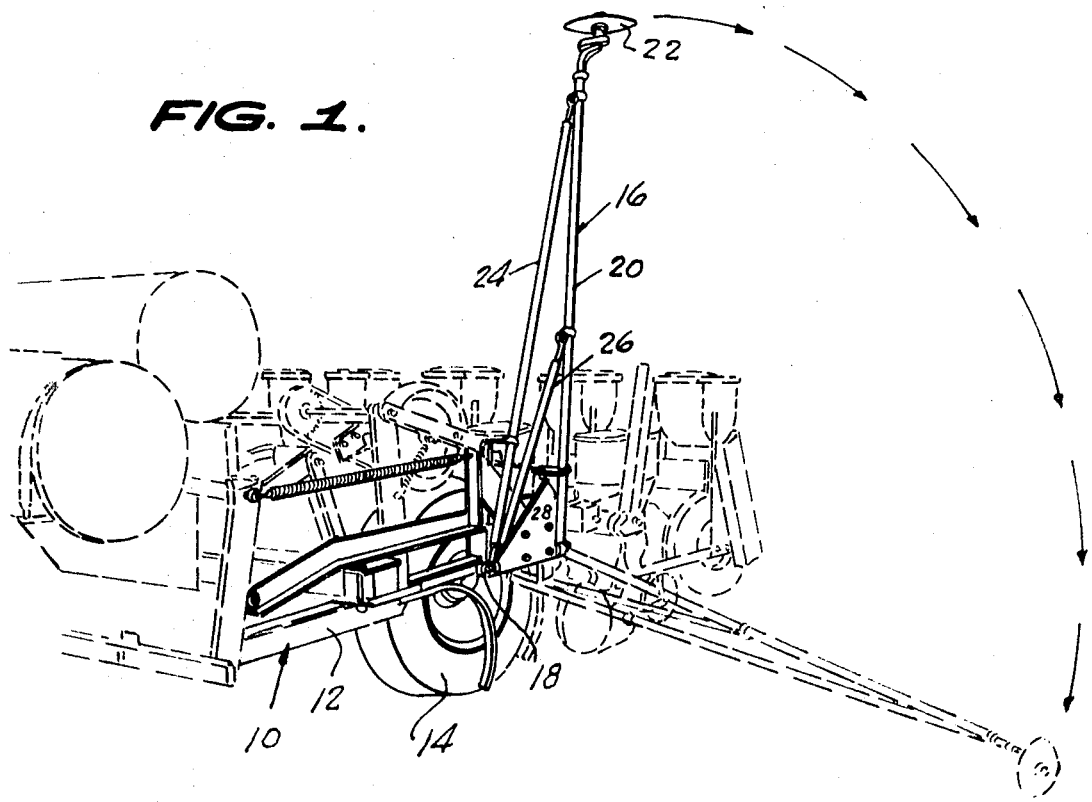
FIG. 1.
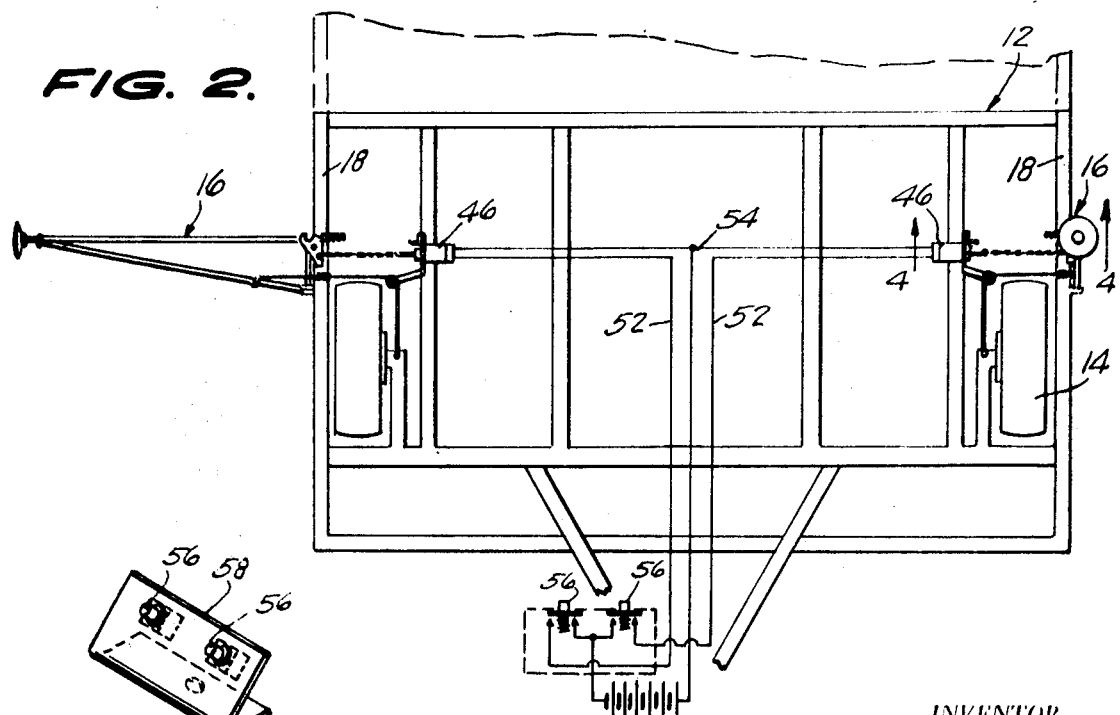
FIG. 2.
FIG. 3.
INVENTOR.
DAVID N. BROWN,
BY
Berman, Davidson & Berman
ATTORNEYS.

INVENTOR.
DAVID N. BROWN,
BY
*Berman, Davidson & Berman*

ELECTRONIC MARKER ACTUATOR

The present invention relates to a new and useful improvement in row markers for farm implements and the like, and more particularly to an actuator device for automatically releasing the marker when desired.

It is an object of the present invention to provide a vertically swingable marker at each side of a tractor or agricultural implement and automatic means for quickly releasing the marker from its inoperative vertical position, so that it may be swung into a horizontal position and onto the ground over which the farm implement is being driven.

It is yet another object of the present invention to provide a latch catch actuator device for quickly releasing a marker from its vertical position to its horizontal position by energizing an electrical circuit so that solenoid means are energized and rotate the catch means to release the marker means from its vertical position so that it will swing downwardly into a horizontal position.

It is yet another object of the present invention to provide a marker device actuator means that is of economical construction and requires substantially no maintenance and which can further be used by a relatively unskilled operator.

Various other objects and advantages of the present invention will be more readily apparent from the following detailed description, when considered in connection with the accompanying drawings forming a part thereof, and in which:

FIG. 1 is a perspective view illustrating the marker device pivotally connected to the frame of a farm implement such as a planter;

FIG. 2 is a top plan view of the planter device shown in FIG. 1, with certain portions left out so as to better illustrate the marker devices attached thereto, with one marker device in an upright position and the other marker device disposed in a downward operative position;

FIG. 3 illustrates a plate for holding the pushbuttons shown in FIG. 2;

Figure 4:
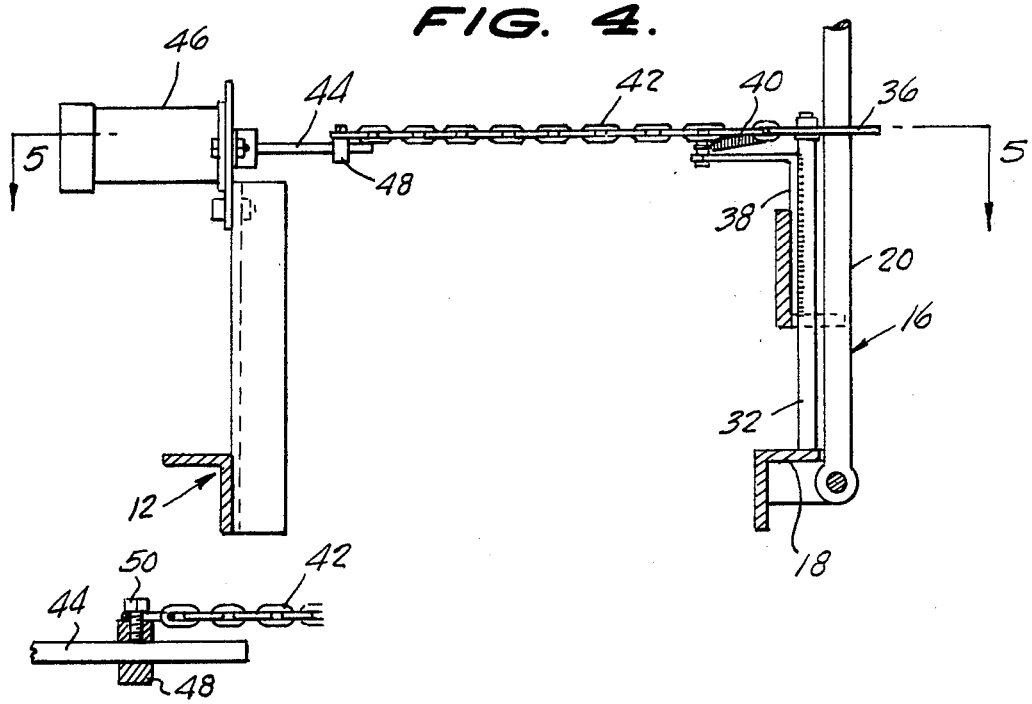
FIG. 4 is an enlarged view taken along the line 4-4 of FIG. 2.

Referring to the drawings, the reference numeral 10 generally designates a farm implement such as a corn planter provided with a frame 12 and wheels 14.

A marker device 16 is pivotally connected to a horizontal frame member 18 by pins and is attached to the member 18 so as to be vertically swingable, as indicated in FIG. 1, from a substantially vertical position therein to a horizontal position, as indicated by dotted lines in FIG. 1, and in the direction or the arc illustrated by the arrows therein.

The marker device 16 comprises an arm 20 with a marker 22 on its outer end. The marker device is further provided with a support arm 24 pivotally connected at its lower or inner end to the frame member 18 and at its upper end to the outer end of the arm 20, so as to form a triangular configuration therewith. The device is further provided with a short crossarm 26 pivotally connected at its lower end to the frame and having its other end connected to the arm 20. A support plate 28 is further included in the marker device.

Referring to FIG. 2, it will be noted that the planter device is provided with two identical marker devices 16 with one on each side thereof, so that they can both be vertically swung into a horizontal position. As best seen in FIG. 2, the marker device on one side of the planter is shown in its vertical position, while the other marker device is shown in its released or downward position.

Referring to FIG. 4, the frame is provided on each side thereof with a vertical rod 32 on which is disposed a horizontally disposed latch plate 34 having a catch 36 therein for receiving the arm 20 of the marker therein. An L-shaped plate 38 is secured to the frame and is provided with a spring member 40 thereon which has one end connected to the latch plate 34, as best seen in FIG. 5, so as to normally pull the catch 36 toward the spring so as to keep the marker device 16 in its upright or vertical position, as best seen in FIG. 1.

The latch plate 36 pivots about the vertical rod 32 and has its other end opposite the catch 36 connected to a chain 42.

The chain 42 is disposed in a horizontal position and has its other end connected to the plunger 44 of a solenoid 46, which solenoid is attached to the planter frame.

Figures 5, 6:
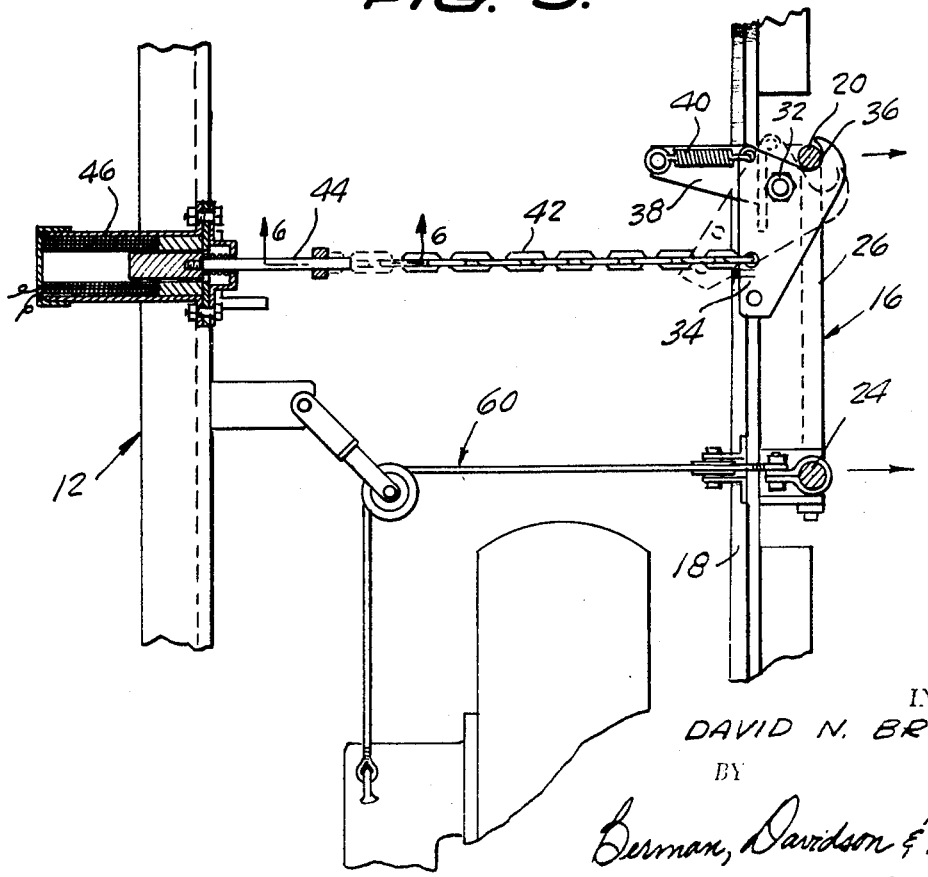
FIG. 5 is a view taken along the lines 5-5 of FIG. 4.
FIG. 6 is a detailed view taken along the lines 6-6 of FIG. 5, illustrating the adjustable collar means on the device.

Referring to FIG. 6, it will be noted that the inner end of the chain 42 is connected to the plunger 44 by an adjustable collar 48 provided with a setscrew 50 so that the collar 48 may be adjusted or moved with respect to the plunger 44 so that it is adjustable and will adapt to various makes or sizes of planters.

Referring to FIG. 2, the solenoids 46 are connected to a source of power such as a battery 51 by electric conduits 52 and 54. Each solenoid is in a separate circuit and a pair of separate pushbuttons 56 are provided in a plate 58, as best seen in FIG. 3, to energize each of the separate solenoid circuits. The pushbuttons are disposed on the planter so as to be readily accessible to the operator thereof.

When it is desired to release one of the marker devices 16, depending upon which side of the planter the device is on, the individual pushbutton 56 is actuated to close and energize the circuit of the particular solenoid it is desired to actuate. The energizing of the circuit will cause the solenoid plunger to move into its housing so that the chain 42 will overcome the force of the spring 40 and cause the catch 36 to be rotated to the dotted position shown in FIG. 5. Thus, the arm 20 will be released and the marker device will move from its upright or vertical position, as indicated in FIG. 1, to its downward position, as indicated by dotted lines in FIG. 1. A cable device 60, which may include rollers or any other suitable equipment, may be utilized with the marker device so as to release it to its upright position when desired.

From the foregoing description, it is apparent that the present invention provides a marker device which can be used for the release of corn planter markers and the like, and which device does away with cumbersome ropes and expensive hydraulic systems utilized heretofore, and provides a simplicity of design which has only one moving part, which is the control rod or plunger of the solenoid.

The present invention further provides a readily accessible means for an unskilled operator to push a button to complete the electrical circuit to the solenoid and release the device.

From the foregoing description, it will be apparent that various changes may be made in the form, location and relative arrangement of several parts without departing from the essential characteristics of the invention, and it is to be understood that this invention is not to be limited except by the scope of the appended claims:

I claim:

1. The combination of a farm implement including a frame, a marker device pivotally connected to said frame for vertical swingable movement, biased latch means engaging said device to hold it in an upright position, and solenoid means for releasing said marker device when energized, wherein said marker device includes an arm with a marker on its end, and said latch means includes a pivoted latch plate with a catch for engaging said arm, and a spring member connected thereto normally pivoting said latch plate in a direction to engage said arm, wherein said solenoid means includes a chain having one end connected to said latch plate opposite said spring member to pivot it in a direction opposite to the direction said spring member pivots it, and wherein said solenoid means includes a solenoid with a plunger connected to the opposite end of said chain, said chain having an adjustable collar connecting it to said plunger.

2. The combination of claim 1 wherein pushbutton means are provided for energizing said solenoid means.

3. The combination of claim 2 wherein two separate and independent solenoid means and two separate and independent marker devices are provided on said farm implement.